(12) United States Patent
Perlowski et al.

(10) Patent No.: US 12,449,546 B2
(45) Date of Patent: Oct. 21, 2025

(54) LIDAR SENSOR SYSTEM FOR ENABLING OR DISABLING USE OF A ROBOTIC ARM

(71) Applicant: ZEBRA TECHNOLOGIES CORPORATION, Lincolnshire, IL (US)

(72) Inventors: Lucjan K. Perlowski, Wheatley Heights, NY (US); Robert E. Beach, Los Altos, CA (US); Chinmay Nanda, Central Islip, NY (US); Yosef Nofal, Bronx, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 860 days.

(21) Appl. No.: 17/721,480

(22) Filed: Apr. 15, 2022

(65) Prior Publication Data

US 2023/0333254 A1 Oct. 19, 2023

(51) Int. Cl.
*G01S 17/93* (2020.01)
*B25J 9/16* (2006.01)
*G01S 7/48* (2006.01)
*G01S 17/06* (2006.01)

(52) U.S. Cl.
CPC ............ *G01S 17/93* (2013.01); *B25J 9/1635* (2013.01); *G01S 7/4808* (2013.01); *G01S 17/06* (2013.01)

(58) Field of Classification Search
CPC ........ G01S 17/93; G01S 7/4808; G01S 17/06; G01S 7/497; G01S 17/931; B25J 9/1635; B25J 9/1676; G05B 2219/37425; G05B 2219/39091; G05B 2219/40298
See application file for complete search history.

(56) References Cited

U.S. PATENT DOCUMENTS

| | | | | |
|---|---|---|---|---|
| 5,448,479 A | * | 9/1995 | Kemner | G05D 1/0061 701/2 |
| 5,469,356 A | * | 11/1995 | Hawkins | G05D 1/0038 318/591 |
| 5,574,637 A | * | 11/1996 | Obata | G05B 19/41835 318/568.2 |
| 6,923,080 B1 | * | 8/2005 | Dobler | G01S 13/931 348/E7.086 |

(Continued)

OTHER PUBLICATIONS

International Search Report and Written Opinion for International Application No. PCT/US2023/15957 mailed on Jun. 23, 2023.

*Primary Examiner* — Bhavesh V Amin (57) ABSTRACT

In some implementations, a robotic device may receive, from a first light detection and ranging (LIDAR) sensor and a second LIDAR sensor, calibration data associated with a physical environment of a robotic arm of the robotic device. The robotic device may determine, based on the calibration data, a configuration of a boundary for the robotic arm. The robotic device may position, relative to the robotic arm, the first LIDAR sensor at a first position and the second LIDAR sensor at a second position to sense an activity within the boundary. The robotic device may monitor the boundary based on first sensor data from the first LIDAR sensor and second sensor data from the second LIDAR sensor. The robotic device may disable, based on the first sensor data or the second sensor data indicating the activity associated with the boundary, the robotic arm from moving within the boundary.

20 Claims, 7 Drawing Sheets

(56) References Cited

U.S. PATENT DOCUMENTS

| | | | | |
|---|---|---|---|---|
| 8,041,458 | B2* | 10/2011 | Amino | G01S 17/88 |
| | | | | 700/259 |
| 8,315,735 | B2* | 11/2012 | Nihei | B25J 9/1676 |
| | | | | 318/568.18 |
| 8,676,379 | B2* | 3/2014 | Okazaki | B25J 9/1676 |
| | | | | 901/49 |
| 9,452,531 | B2* | 9/2016 | Kikkeri | B25J 9/1676 |
| 10,215,852 | B1* | 2/2019 | Byrne | G01S 13/881 |
| 10,445,944 | B2* | 10/2019 | Galera | G06T 19/20 |
| 10,518,424 | B2* | 12/2019 | Zillich | B25J 19/063 |
| 11,069,082 | B1* | 7/2021 | Ebrahimi Afrouzi | H04N 23/56 |
| 11,097,422 | B2* | 8/2021 | Denenberg | B25J 9/1666 |
| 11,148,293 | B2* | 10/2021 | Song | B25J 9/1664 |
| 11,156,981 | B2* | 10/2021 | Dedkov | B25J 9/1666 |
| 11,199,614 | B1* | 12/2021 | Gan | G01S 17/42 |
| 11,248,744 | B2* | 2/2022 | Romano | F16P 3/147 |
| 11,254,004 | B2* | 2/2022 | Denenberg | B25J 13/08 |
| 11,518,051 | B2* | 12/2022 | Vu | F16P 3/142 |
| 11,541,543 | B2* | 1/2023 | Vu | B25J 19/06 |
| 11,543,798 | B2* | 1/2023 | Denenberg | G06T 17/00 |
| 11,613,017 | B2* | 3/2023 | Denenberg | B25J 9/1666 |
| | | | | 382/153 |
| 11,636,648 | B2* | 4/2023 | Mello | G06T 7/0004 |
| | | | | 700/259 |
| 11,679,504 | B2* | 6/2023 | Denenberg | G06T 17/10 |
| | | | | 382/153 |
| 11,685,302 | B2* | 6/2023 | Raucoulles | H04N 13/239 |
| | | | | 348/148 |
| 11,697,213 | B2* | 7/2023 | Wilkas | G01S 13/42 |
| | | | | 250/559.33 |
| 11,820,025 | B2* | 11/2023 | Vu | G01S 17/87 |
| 11,945,119 | B2* | 4/2024 | Denenberg | G01S 7/4876 |
| 12,049,014 | B2* | 7/2024 | Vu | G01S 17/89 |
| 12,097,625 | B2* | 9/2024 | Vu | G01S 17/89 |
| 12,259,733 | B2* | 3/2025 | Vishnu | G01S 7/4813 |
| 2005/0166413 | A1* | 8/2005 | Crampton | G01B 11/03 |
| | | | | 33/503 |
| 2006/0089765 | A1* | 4/2006 | Pack | G05D 1/0278 |
| | | | | 318/587 |
| 2008/0021597 | A1* | 1/2008 | Merte | F16P 3/144 |
| | | | | 700/255 |
| 2009/0149990 | A1* | 6/2009 | Myeong | G05D 1/0274 |
| | | | | 701/25 |
| 2013/0002489 | A1* | 1/2013 | Erad | H01Q 21/29 |
| | | | | 342/432 |
| 2015/0310281 | A1* | 10/2015 | Zhu | G06T 7/246 |
| | | | | 382/104 |
| 2016/0224012 | A1 | 8/2016 | Hunt | |
| 2016/0354927 | A1* | 12/2016 | Kikkeri | F16P 3/142 |
| 2017/0302905 | A1* | 10/2017 | Shteinfeld | G06T 7/62 |
| 2017/0312916 | A1* | 11/2017 | Williams | G01C 21/206 |
| 2018/0126547 | A1 | 5/2018 | Corkum et al. | |
| 2018/0151012 | A1* | 5/2018 | Kuraoka | F16P 3/08 |
| 2018/0222052 | A1* | 8/2018 | Vu | G01S 17/04 |
| 2018/0361577 | A1* | 12/2018 | Williams | A47L 11/20 |
| 2018/0361581 | A1* | 12/2018 | Williams | A47L 11/00 |
| 2018/0361583 | A1* | 12/2018 | Williams | G05D 1/0219 |
| 2018/0361584 | A1* | 12/2018 | Williams | B25J 9/1679 |
| 2018/0361585 | A1* | 12/2018 | Williams | A47L 11/14 |
| 2018/0364045 | A1* | 12/2018 | Williams | G01S 17/88 |
| 2019/0091870 | A1 | 3/2019 | Hino et al. | |
| 2019/0204427 | A1* | 7/2019 | Abari | G01S 17/86 |
| 2019/0248002 | A1* | 8/2019 | Deyle | B25J 19/023 |
| 2019/0337152 | A1 | 11/2019 | Homberg et al. | |
| 2019/0339356 | A1* | 11/2019 | Schildknecht | G01S 7/4816 |
| 2020/0011995 | A1* | 1/2020 | Send | G01S 3/783 |
| 2020/0173777 | A1 | 6/2020 | Pivac et al. | |
| 2020/0406904 | A1* | 12/2020 | Yan | G07C 5/0841 |
| 2020/0410715 | A1* | 12/2020 | Cadien | G06T 7/70 |
| 2021/0004985 | A1* | 1/2021 | Lee | G05D 1/0088 |
| 2021/0026368 | A1* | 1/2021 | Cochran | G05D 1/249 |
| 2021/0089040 | A1* | 3/2021 | Ebrahimi Afrouzi | G05D 1/0248 |
| 2021/0101283 | A1* | 4/2021 | Shin | B25J 9/161 |
| 2021/0107152 | A1* | 4/2021 | Honkote | B25J 9/1661 |
| 2021/0134079 | A1* | 5/2021 | Nee | B65G 47/80 |
| 2021/0157312 | A1* | 5/2021 | Cella | G01M 13/045 |
| 2021/0199479 | A1* | 7/2021 | Lau | G01S 13/931 |
| 2021/0316669 | A1* | 10/2021 | Wang | G01S 13/862 |
| 2021/0325520 | A1* | 10/2021 | Cai | B32B 33/00 |
| 2022/0026920 | A1* | 1/2022 | Ebrahimi Afrouzi | G06N 7/01 |
| 2022/0129006 | A1* | 4/2022 | Vishnu | G01S 15/87 |
| 2023/0157505 | A1* | 5/2023 | Shim | A47L 11/4066 |
| | | | | 15/320 |

\* cited by examiner

LIDAR SENSOR SYSTEM FOR ENABLING OR DISABLING USE OF A ROBOTIC ARM

TECHNICAL FIELD

The present disclosure relates generally to controlling the use of a robotic arm based on a light detection and ranging (LIDAR) sensor arrangement and, for example, to enable and disable the use of the robotic arm based on the LIDAR sensor arrangement.

BACKGROUND

Robotic devices include a variety of devices that are capable of movement within a physical environment. Robotic devices may be used for a variety of purposes, such as delivery of people and/or objects, warehouse inventory management, retail inventory management and labeling, and loading and unloading objects, among other examples. When robotic devices are interacting with a physical environment, caution must be taken in the design and operation of the robotic devices to prevent injury or damage to people or objects that share the physical environment. To ensure that robotic devices, and moveable parts of robotic devices (e.g., extendable and retractable robotic arms) do not come into contact with a person or object, there is a need for a system to detect and prevent unintended contact with the moveable parts.

SUMMARY

Some implementations described herein relate to a method for controlling a robotic device. The method may include receiving, from a first LIDAR sensor and a second LIDAR sensor, calibration data associated with a physical environment of a robotic arm of the robotic device. The method may include determining, based on the calibration data, a configuration of a boundary for the robotic arm. The method may include positioning, relative to the robotic arm, the first LIDAR sensor at a first position and the second LIDAR sensor at a second position according to the configuration of the boundary to enable the first LIDAR sensor and the second LIDAR sensor to sense an activity within the boundary. The method may include monitoring the boundary of the robotic arm based on first sensor data from the first LIDAR sensor and second sensor data from the second LIDAR sensor. The method may include disabling, based on the first sensor data or the second sensor data indicating the activity associated with the boundary, the robotic arm from moving within the boundary.

Some implementations described herein relate to a robotic device. The robotic device may include a LIDAR sensor arrangement, a robotic arm, and a controller. The controller may be configured to receive, from one or more LIDAR sensors of the LIDAR sensor arrangement, calibration data associated with a physical environment of the robotic device. The controller may be configured to determine, based on the calibration data, an operational region of movement of the robotic arm. The controller may be configured to position, based on a boundary of the operational region, the one or more LIDAR sensors into corresponding locations to sense an activity within the boundary. The controller may be configured to disable, based on sensor data from the one or more LIDAR sensors indicating the activity, the robotic arm to prevent the robotic arm from moving within the boundary.

Some implementations described herein relate to a tangible machine-readable medium that stores a set of instructions for a robotic device. The set of instructions, when executed by one or more processors of the robotic device, may cause the robotic device to receive, from a first LIDAR sensor and a second LIDAR sensor, calibration data associated with a physical environment of a robotic arm of the robotic device. The set of instructions, when executed by one or more processors of the robotic device, may cause the robotic device to determine, based on the calibration data, a configuration of a boundary for the robotic arm. The set of instructions, when executed by one or more processors of the robotic device, may cause the robotic device to position, relative to the robotic arm, the first LIDAR sensor at a first position and the second LIDAR sensor at a second position according to the configuration of the boundary to enable the first LIDAR sensor and the second LIDAR sensor to sense an activity within the boundary. The set of instructions, when executed by one or more processors of the robotic device, may cause the robotic device to monitor the boundary of the robotic arm based on first sensor data from the first LIDAR sensor and second sensor data from the second LIDAR sensor. The set of instructions, when executed by one or more processors of the robotic device, may cause the robotic device to disable, based on the first sensor data or the second sensor data indicating the activity associated with the boundary, the robotic arm from moving within the boundary.

DETAILED DESCRIPTION

The following detailed description of example implementations refers to the accompanying drawings. The same reference numbers in different drawings may identify the same or similar elements.

Robotic devices, such as those used for the delivery of people and/or objects, warehouse inventory management, retail inventory management and labeling, loading and unloading objects, and/or the like, may have moveable parts that present a risk to people and other objects within a physical environment. While robotic devices often have sensors to detect objects within a physical environment and to facilitate navigation, the sensors are often fixed to the robotic devices and only able to detect objects from a particular fixed position. This may lead to blind spots for the sensors, which may pose a risk to people or objects sharing the physical environment with the robotic device. The fixed positions and potentially limited points of view of sensors may also lead to the placement of many sensors on and around robotic devices in an attempt to reduce blind spots and capture many different points of view, but this may increase the cost and complexity of the robotic devices. In addition, when it comes to safety of people and/or objects, and preventing contact between moveable parts and the people and objects, the speed at which the robotic device responds to sensor input may be important. While some sensors are capable of capturing wide fields of view with a high precision in an attempt to eliminate blind spots, the increased field of view and precision may come at a cost of speed, for some types of sensors. For example, obtaining, interpreting, and responding to input from three-dimensional sensors with a long range and wide field of view may take a significant amount of time, due to the complexity of the sensor input. With some sensors, increased complexity may lead to slower detection of an object within the physical environment of the robotic device and/or a slower response time than less complex systems. Slow response times may be detrimental to the safety of people and objects that share a physical environment with the robotic devices.

Some implementations described herein enable a robotic device to enable and/or disable moveable parts of the robotic device using a LIDAR sensor arrangement. For example, a LIDAR sensor arrangement may include one or more LIDAR sensors that can be positioned with a moveable support structure (e.g., one or more retractable arms) in order to create and monitor a boundary around one or more moveable parts of the robotic device, such as a robotic arm. In some aspects, the robotic device may be calibrated based on LIDAR sensor input to position the one or more LIDAR sensors relative to a moveable part. This may enable the robotic device to form a boundary around the moveable part, and the moveable part may be enabled and/or disabled based on movement detected at or within the boundary. As a result, the robotic device is able to reconfigure and/or recalibrate the LIDAR sensor arrangement based on the physical environment of the robotic device and the moveable part(s) of the robotic devices. This may ensure that the robotic device is able to create a boundary, using the LIDAR sensor arrangement, that has a moveable field of view and is able to quickly detect and interpret sensor input from the LIDAR sensor arrangement in order to enable and/or disable the moveable parts. The ability to reposition the LIDAR sensors may lead to more precise boundaries and detection that is less likely to have blind spots in an operational region of the moveable parts (e.g., relative to fixed position sensors), and the sensor arrangement may also be capable of quickly detecting activity within the boundary to more quickly enable and/or disable the moveable parts (e.g., relative to slower and/or more complex sensor arrangements). In addition, the ability to reconfigure and/or recalibrate the LIDAR sensor arrangement may enable the robotic device to dynamically adjust a boundary based on the physical environment, which may change as the robotic device moves and/or the physical environment otherwise changes. In this way, the safety of people and objects that share a physical environment with the robotic device may be improved, and the cost and complexity associated with the use of more numerous and/or complex sensors may be reduced.

Figure 1:
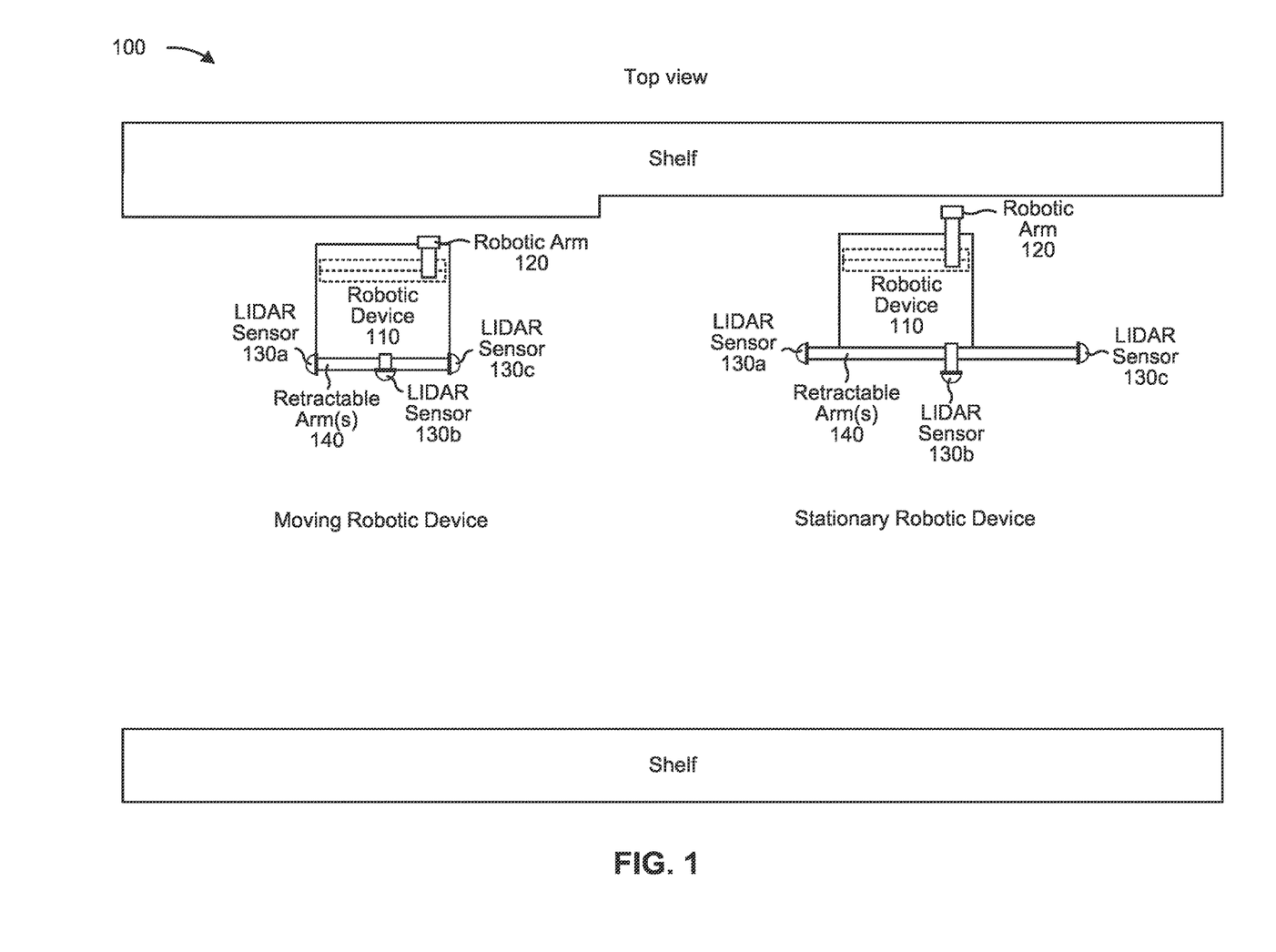
FIG. 1 a diagram of a top-down view of an example implementation associated with a robotic device, a robotic arm, and a LIDAR sensor arrangement, as described herein.

FIG. 1 is a diagram of a top-down view of an example implementation 100 associated with a robotic device, a robotic arm, and a LIDAR sensor arrangement. As shown in FIG. 1, example implementation 100 includes a robotic device 110, a robotic arm 120, LIDAR sensors 130a, 130b, and 130c, and retractable arm(s) 140. The robotic device is described in more detail below.

As shown by example implementation 100, the robotic device 110 is a moveable robotic device that operates within a physical environment that includes shelves, such as a retail store, warehouse, and/or the like. The robotic device includes a robotic arm 120, which is a moveable part of the robotic device that is capable of moving within the physical space to interact with the environment. For example, the robotic arm 120 may be used to stock shelves, pull product or other objects from shelves, add or remove labels from shelves, and/or scan objects on the shelves, among other examples. The robotic device also includes a LIDAR arrangement that includes three LIDAR sensors 130a-130c, mounted on retractable arms 140.

In some implementations, the LIDAR sensors 130a-130c may be three-dimensional (3D), two-dimensional (2D), or a combination of 3D and 2D. A LIDAR sensor may measure ranges to objects within its field of view (e.g., whether a 2D or 3D field of view) by rapidly emitting laser pulses and detecting energy reflected off of the objects within its field of view. The distance to objects within the field of view of the LIDAR sensor may be determined based on an amount of time required for light to be reflected back to the LIDAR sensor. In some implementations, the sensor data provided by the LIDAR sensors 130a-130c may be provided to a controller of the robotic device 110, where the sensor data may be interpreted (e.g., to provide a mapping of objects in the physical environment in which the robotic device 110 operates).

The robotic device 110 is depicted in FIG. 1 in two different states. In a first state, the robotic device 110 is moving, and both the robotic arm 120 and retractable arms 140 are retracted (e.g., to avoid contact with people and/or objects as the robotic device 110 moves). In a second state, the robotic device is stationary, and the robotic arm 120 may be extended and operating within the physical environment, while the retractable arms 140 are extended to enable the LIDAR sensors 130a-130c to sense activity within a boundary defined by the LIDAR sensors 130a-130c, as described in further detail herein.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. For example, the robotic device 110 may be an unmanned aerial vehicle, or a robotic device attached to a rail for movement, among other examples. As another example, the robotic device 110 may include multiple robotic arms, different moveable parts, more or fewer LIDAR sensors, a different combination of sensors (e.g., different types of LIDAR sensors, camera devices as sensors, and/or radar devices as sensors, among other examples), more or fewer retractable arms (e.g., some sensors may be fixed on the robotic device 110 while others may be attached to a retractable arm), a different position or positions of the retractable arms, and/or the like.

Figure 2:
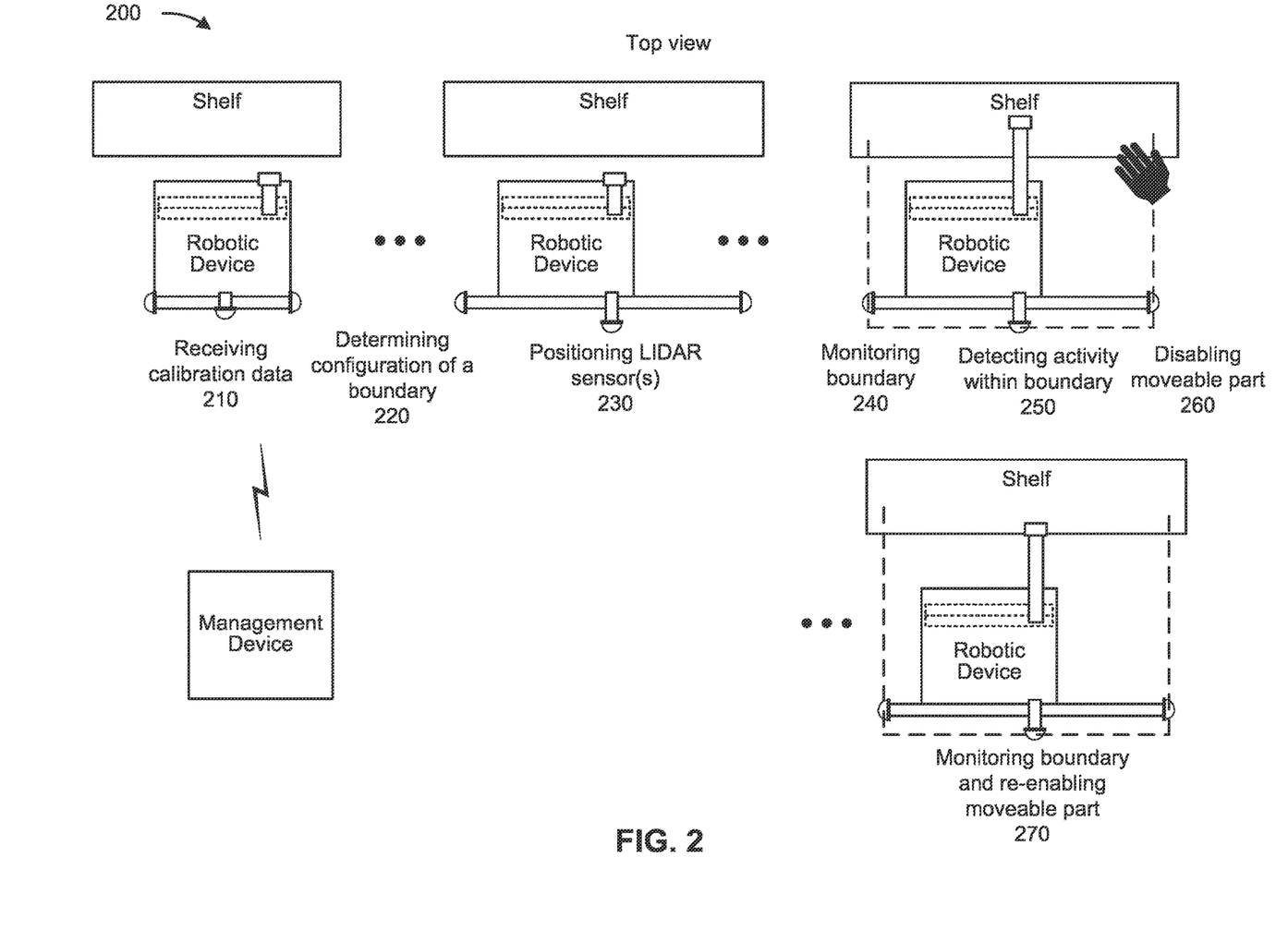
FIG. 2 is a diagram of a top-down view of an example implementation associated with enabling and disabling use of a robotic arm based on a LIDAR sensor arrangement, as described herein.

FIG. 2 is a diagram of a top-down view of an example implementation 200 associated with enabling and disabling the use of a robotic arm based on a LIDAR sensor arrangement. As shown in FIG. 2, example implementation 200 includes a robotic device, and a management device. These devices are described in more detail herein.

As shown by reference number 210, the robotic device may receive calibration data associated with a physical environment of a moveable part of the robotic device. In some implementations, the calibration data may be used to determine where the LIDAR sensor(s) of the LIDAR sensor arrangement should be positioned to establish a boundary for the moveable part. For example, the calibration data may indicate an operational region of movement of the moveable part, which may define the dimensions of the space in which the moveable part is to operate.

In some implementations, at least a portion of the calibration data may be provided by a management device. For example, a remote management device may be in communication with the robotic device and capable of providing instructions for the robotic device to follow to perform various operations. In some implementations, the calibration data may indicate the range of the moveable part in various dimensions. For example, the calibration data may indicate that the moveable part may be capable of reaching X meters in a first direction, Y meters in a second direction, and Z meters in a third direction. The distance may be measured from various locations, including a current position of the moveable part, and/or a reference point on the robotic device, among other examples. In some implementations, the calibration data may indicate an intended range of the moveable parts in various dimensions. For example, rather than indicating a maximum range of the moveable part, the calibration data may indicate a maximum range of the area in which the moveable part is instructed to perform an action or actions. In a retail store shelf labeling example, the calibration data may indicate that a robot arm for labeling prices will remain within certain coordinates or within a certain distance in various dimensions when it performs the labeling task, even in a situation where the robotic arm might be cable of moving beyond the specified distance and/or dimensions.

In some implementations, at least a portion of the calibration data may be provided by the LIDAR sensor arrangement. For example, the LIDAR sensors included in the LIDAR sensor arrangement may scan the physical environment around the robotic device to detect objects (e.g., shelves, objects on the shelves, walls, and/or the like) within the physical environment. In some implementations, the robotic device may use sensor data from the LIDAR sensors to generate a map of the physical environment, which may provide a 2D or 3D mapping of objects within the physical environment. In this way, the map of the physical environment may account for different shapes, sizes, and positions of objects (e.g., including shelves, objects on the shelves, walls, and/or the like) within the physical environment. In some implementations, the robotic device may move the LIDAR sensors around the physical environment (e.g., via retractable arms) to generate the map. For example, in addition to moving LIDAR sensors in three dimensions (e.g., X, Y, and Z positions), the LIDAR sensors may also be attached to a support structure (e.g., a retractable arm) in a manner that provides other degrees of freedom for the LIDAR sensors, such as a three-axis gimbal mount, which may provide roll, pitch, and yaw for the LIDAR sensors. In this way, the LIDAR sensor arrangement may produce calibration data associated with a physical environment in which the robotic device, and the moveable part of the robotic device, operate.

In some implementations, the receipt of the calibration data may be based on a triggering event that specifies one or more conditions for obtaining the calibration data. For example, a trigger may include the robotic device receiving instructions to perform an action with the moveable part; upon the condition associated with the trigger being satisfied (e.g., receiving the instructions), the robotic device may obtain the calibration data (e.g., by requesting calibration data from the management device and/or obtaining calibration data via one or more LIDAR sensors). As another example, a trigger may include the robotic device stopping (e.g., after a period of movement), the robotic device moving a moveable part, the robotic device or another device (e.g., the management device) requesting calibration, and/or the like.

As shown by reference number 220, the robotic device may determine a configuration of a boundary. For example, the robotic device may determine a configuration of the boundary based on the calibration data. In a situation where the calibration data indicates a range of the moveable part, or an operational region of movement of the moveable part, the range may indicate how the boundary should be configured. As described in further detail herein, the boundary may be intended to surround the operational region of movement of the moveable part, such that any movement associated with an external object (e.g., a human hand, foot, and/or the like, which is not part of the robotic device or an object with which the robotic device interacts) detected within the boundary, or crossing the boundary, may cause the robotic device to disable the moveable part.

In some implementations, the robotic device may be configured to configure the boundary to be a particular distance from the range or operational region of the moveable part. For example, if an operational range of a moveable part is one meter in each of a first, second, and third dimension, the boundary may be configured to be one meter, at least one meter, or one meter plus a preconfigured distance (e.g., a fixed distance or relative distance) in each dimension. In some implementations, the boundary may be configured relative to the moveable part. For example, the boundary may be configured relative to the operational range and position of the moveable part, rather than a range of the robotic device or a maximum range of the moveable part. In this situation, the boundary may be placed in a manner designed to enable the LIDAR arrangement to more closely map the operational region in which the moveable part will move. For example, the boundary may be placed to account for different shapes, sizes, and positions of objects (e.g., including shelves, objects on the shelves, walls, and/or the like) within the physical environment. In a situation where the robotic device includes multiple moveable parts, the boundary may be configured based on the range or operational region of each moveable part.

In some implementations, the boundary may be based on the number, type, position, and/or range of the LIDAR sensors included in the LIDAR arrangement. For example, the LIDAR arrangement may be limited in the type of boundary that the LIDAR arrangement is capable of producing (e.g., based on the number of LIDAR sensors, the type of LIDAR sensors, the position of the LIDAR sensors, and the range of the LIDAR sensors). In some situations, increasing the number of LIDAR sensors, improving positioning capabilities of the LIDAR arrangement (e.g., with retractable arms having greater range, positioning capabilities, and/or additional degrees of freedom), and/or using higher capability LIDAR sensors (e.g., 3D LIDAR sensors as opposed to 2D LIDAR sensors, and/or LIDAR sensors with a greater range) may lead to potential improvements in the boundary coverage capabilities of the LIDAR arrangement. In some implementations, even a single LIDAR sensor may be sufficient to configure a boundary, especially when an operational range of the moveable part is limited and/or in a physical environment with some physical constraints on the boundary. For example, in a situation where the robotic device is near one or more walls or similar structures, a single 2D LIDAR sensor arranged to sense activity in a single two-dimensional plane may provide a sufficient boundary for the physical environment. As another example, a single 3D LIDAR sensor, placed near the moveable part in at least two dimensions (e.g., horizontal and vertical dimensions) to sense activity in a field of view that encompasses the operational range of the moveable part may provide a sufficient boundary.

As shown by reference number 230, the robotic device may position the LIDAR sensors of the LIDAR arrangement based on the configuration. In some implementations, the LIDAR sensors are positioned relative to the moveable part. For example, the LIDAR sensors may be positioned relative to a current position of the moveable part, prior to the moveable part being operational. As another example, the LIDAR sensors may be positioned relative to a position where the moveable part will be operational. For example, boundary may be configured to be centered on a center (or some offset from the center) of an operational region of the moveable part, which may differ depending on the activity that the moveable part is performing. Accordingly, the position of the LIDAR sensors may change based on how the moveable part moves as it performs actions, and/or based on the operational region associated with an action being performed by the moveable part. This enables the LIDAR sensors to be arranged and rearranged to provide a consistent boundary relative to a position of the moveable part.

In some implementations, the LIDAR sensors may be positioned using a moveable support structure, which may include multiple moving parts to arrange the LIDAR sensors. Example support structures include: retractable arms, arms capable of positioning in three dimensions, and/or attachment structures that provide LIDAR sensors with one, two, or three degrees of rotational freedom (e.g., a three-axis gimbal providing roll, pitch, and yaw). In a situation where the robotic device includes multiple moveable parts, one set of LIDAR sensors may positioned relative to each of the moveable parts (e.g., central to a midpoint of the operational area of each moveable part). In some implementations, separate moveable parts may be associated with a corresponding LIDAR sensor, such that some LIDAR sensors are positioned relative to the corresponding moveable part.

In the example implementation 200, the LIDAR arrangement includes three 2D LIDAR sensors, one sensor to sense in a vertical 2D plane on a side of the robotic device opposite the moveable part, and two sensors to sense in two vertical planes on the left and right side of the robotic device. Retractable arms on the left and right side LIDAR sensors enable the 2D LIDAR sensors to be extended, enabling them to sense in a boundary that includes the operational region of the moveable part. The LIDAR sensor opposite the moveable part, in this example, is retractable and is extended to provide a back-side boundary for the robotic device.

As shown by reference number 240, the robotic device monitors the boundary based on sensor data received from the LIDAR arrangement. For example, and as shown, the LIDAR arrangement provides a boundary defined by three 2D vertical planes, one provided by each of the three LIDAR sensors. To monitor the boundary, the LIDAR sensor input is processed by the robotic device to determine if there is any activity (e.g., movement) that crosses the boundary or takes place within the boundary. In some implementations, the types of sensors used may affect the manner in which activity at or within the boundary is detected. For example, in the example arrangement of 2D LIDAR sensors, only movement that crosses the boundary would be detected, as the 2D LIDAR sensers would not pick up any movement not incident on one of the three vertical planes in which those LIDAR sensors are configured to sense. While the actual sensing range of each 2D LIDAR sensor may extend beyond the depicted boundary, the robotic device may ignore such movement taking place outside the boundary. For example, the left and right LIDAR sensors may be capable of detecting a person or object moving behind the robotic device, but as long as the movement is beyond the plane of the back-side LIDAR sensor opposite the robotic device, the robotic device may ignore the movement as it is not within the configured boundary. As another example, a 3D LIDAR sensor may be able to detect activity within the boundary, depending on a field of view of the 3D LIDAR sensor and any obstructions. Other LIDAR arrangements and boundary configurations may lead to different areas being monitored by the robotic device.

As shown by reference number 250, the robotic device detects whether there is any activity associated with the boundary (e.g., movement at or within the boundary). For example, the robotic device may detect activity associated with the boundary based on sensor data from the LIDAR arrangement. In some implementations, to determine if there is activity at or within the boundary, the robotic device may compare a map of the physical environment (e.g., previously generated by the LIDAR arrangement) to a current state of the physical environment as indicated by sensor input from the LIDAR arrangement. If a difference is detected, it is a likely indicator that some movement has occurred at or within the boundary. In some implementations, the robotic device may ignore movement associated with the moveable part (e.g., to avoid false positives based on movement of the moveable part). For example, in addition to the movement of the moveable part itself, in a situation where the moveable part is expected to be interacting with an object within the boundary, movement of the object may also be ignored.

As shown by reference number 260, the robotic device may disable the moveable part of the robotic device based on detecting activity associated with the boundary. For example, when movement is detected (e.g., as described herein), the moveable part may be disabled as a safety precaution. In some implementations, disabling the moveable part may include disabling all activity being performed by the moveable part or only a portion of the activities of the moveable part. For example, the robotic device may be configured to disable one or more activities of the moveable part based on detecting the activity. For example, the robotic device may be configured to stop all movement of the moveable part within the boundary while allowing activity that does not involve movement (e.g., scanning) to continue.

In some implementations, whether the activity associated with the boundary is detected may be used as a condition for enabling the moveable part. For example, when the robotic device arrives at a particular physical location to perform operations with the moveable part, the robotic device may first use the LIDAR arrangement to monitor the boundary to ensure that no activity associated with the boundary takes place for a threshold period of time. Based on no activity associated with the boundary occurring within the threshold period of time, the robotic device may enable the moveable part and cause it to perform the operations. In this way, the robotic device may determine that a physical environment is safe prior to beginning operations with the moveable part.

As shown by reference number 270, the robotic device may monitor the boundary and re-enable the moveable part. For example, based on a threshold period of inactivity associated with the boundary being met, the robotic device may determine to continue operations of the moveable part. In this way, after the moveable part is disabled due to activity associated with the boundary, the robotic device is able to monitor the boundary for further movement before continuing with the operations of the moveable part. In this way, the robotic device may ensure that the physical environment is safe prior to resuming operations of the moveable part.

In some implementations, the robotic device may repeat any of the aforementioned functions, including repeating calibration and/or configuration (including repositioning the sensors), based on a change in the physical environment and/or based on detecting the activity associated with the boundary. For example, activity associated with the boundary may cause a change in the physical environment (e.g., removal or addition of an object on a shelf), and the robotic device may perform recalibration and/or reconfiguration to generate a new boundary based on any changes in the physical environment. In addition, the robotic device may be mobile, and a change in the physical environment may result from the robotic device moving. After such a change in the physical environment (e.g., the robotic device moving from one area to another, such as one shelf to another), the robotic device may perform a recalibration and/or reconfiguration to generate a new boundary. This enables the robotic device to dynamically change the boundary based on activity that may cause a change in the physical environment.

In some implementations, the robotic device may determine a new configuration of a new boundary (e.g., repeat calibration and/or configuration) based on an occurrence of one or more triggering conditions. Example triggering conditions may include: detecting passage of a period of time (e.g., for periodic recalibrating and/or reconfiguring), detecting that the robotic device has moved (e.g., from one position within the physical environment to another), detecting that the robotic arm has moved, detecting that an object within the boundary has moved (e.g., using LIDAR sensors, based on the robotic arm executing instructions to move an object, and/or the like), detecting the activity associated with the boundary occurred, detecting instructions (e.g., received from an external device, such as a management device) to recalibrate and/or reconfigure the boundary, and/or detecting any other change in the physical environment, among other examples. The robotic device may use any single trigger or combination of triggers to repeat calibration and/or configuration. For example, one set of triggers may cause recalibration, while another (same or different) set of triggers may cause reconfiguration of the boundary. The triggers may also be reconfigured and/or updated (e.g., by a management device). Repeating calibration and/or configuration may also cause the robotic device to reposition at least one sensor, as described herein.

In some implementations, the sensor(s) used for calibration may be the same as those used for configuration and/or monitoring. For example, the same set of LIDAR sensors that collects data for calibration may be the same set configured by the robotic device to monitor a boundary. In some implementations, the sensor(s) used for calibration may be different from those used for configuration and monitoring. For example, one or more cameras may be used for calibration while a set of LIDAR sensors may be used for configuration and monitoring.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. For example, the robotic device may be an unmanned aerial vehicle, or a robotic device attached to a rail for movement, among other examples. As another example, the robotic device may include multiple robotic arms, different moveable parts, more or fewer LIDAR sensors, a different combination of sensors (e.g., different types of LIDAR sensors, camera devices as sensors, and/or radar devices as sensors, among other examples), more or fewer retractable arms (e.g., some sensors may be fixed on the robotic device while others may be attached to a retractable arm), a different position or positions of the retractable arms, retractable arms with different positioning capabilities and different degrees of freedom to move in multiple dimensions, different degrees of freedom associated with the LIDAR sensors, different boundaries configured by the robotic device, and/or the like. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
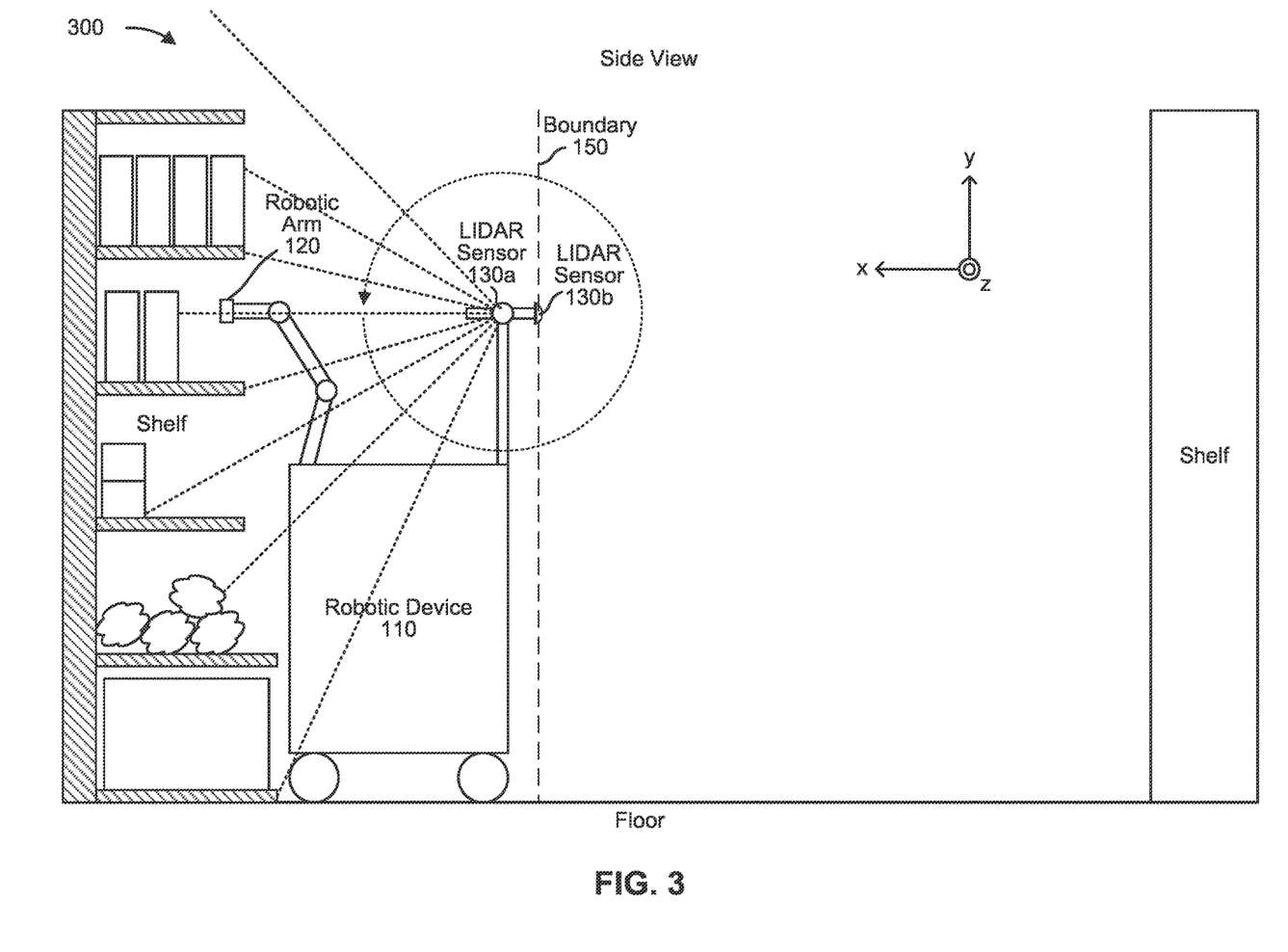
FIG. 3 is a diagram of a side-view of an example implementation associated with a robotic device, a robotic arm, and a LIDAR sensor arrangement, as described herein.

FIG. 3 is a diagram of a side-view of an example implementation 300 associated with a robotic device, a robotic arm, and a LIDAR sensor arrangement. As shown in FIG. 3, example implementation 300 includes a robotic device 110. The robotic device 110 is described in more detail herein.

As shown by example implementation 300, and similar to example implementation 100, the robotic device 110 is a moveable robotic device that operates within a physical environment that includes shelves, such as a retail store, warehouse, and/or the like. The robotic device includes a robotic arm 120 to interact with a shelf and/or objects on the shelf, and depicts two 2D LIDAR sensors 130a and 130b, while a third 2D LIDAR sensor (not shown) may be on a side of the robotic device opposite the LIDAR sensor 130a in the z direction.

In this example, the LIDAR arrangement provides a boundary 150 (e.g., portions of which are depicted by the dotted and dashed lines) using three 2D LIDAR sensors. The side LIDAR sensors (e.g., LIDAR sensor 130a and the LIDAR sensor opposite, not shown) may provide 2D portions of the boundary 150 in the x,y plane on either side of the robotic arm 120. The LIDAR sensor 130a in this example is depicted as covering 360 degrees in the x, y plane. The back LIDAR sensor (e.g., LIDAR sensor 130b) may provide a 2D boundary in the y,z plane on a side of the robotic device 110 opposite the robotic arm 120. In this situation, the boundary 150 may be formed by three planes provided by the LIDAR arrangement, and the robotic device 110 is configured to detect activity associated with any of the three planes (e.g., activity within a zone or boundary defined by the three planes, activity associated with crossing the boundary, and/or the like), as described herein.

In this example, the LIDAR sensor 130a is depicted as being positioned vertically to match a position of the robotic arm 120. In this way, the LIDAR sensor 130a may be better able to detect activity at a height that is even with the robotic arm 120, which might otherwise be blocked by obstructions, such as other shelves or objects on the shelves, due to a difference in the point of view of the LIDAR sensor 130*a* relative to the robotic arm 120 or differences in the position, shape, and size of shelves and/or objects within the field of view of the LIDAR sensor 130*a*. For example, if the LIDAR sensor 130*a* were positioned higher or lower (in the y dimension), relative to the robotic arm 120, the field of view of the LIDAR sensor 130*a* may change and may affect whether the LIDAR sensor 130*a* is able to detect movement at the back of the shelf where the robotic arm 120 is moving. Similarly, the position and field of view of the LIDAR sensors may enable the LIDAR sensors to detect differences in shelving shape, size, and/or position (e.g., the bottom shelves of example 300 extend further than the top shelves), and detect differences in object shape, size, and/or position (e.g., differently shaped objects at different depths on the shelves). This may enable the robotic device 110 to configure and monitor a more accurate boundary across varying and uneven surfaces than might otherwise be possible if the LIDAR sensor arrangement were not as flexible as described herein.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. For example, example, the robotic device 110 may include multiple robotic arms, different moveable parts, more or fewer LIDAR sensors, a different combination of sensors (e.g., different types of LIDAR sensors, camera devices as sensors, and/or radar devices as sensors, among other examples), more or fewer retractable arms (e.g., some sensors may be fixed on the robotic device while others may be attached to a retractable arm), a different position or positions of the retractable arms, retractable arms with different positioning capabilities and different degrees of freedom to move in multiple dimensions (e.g., retractable arms that are capable of translating in the x, y, and z directions, and rotating about the x, y, and z axis), different degrees of freedom associated with the LIDAR sensors, different boundaries configured by the robotic device, and/or the like. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
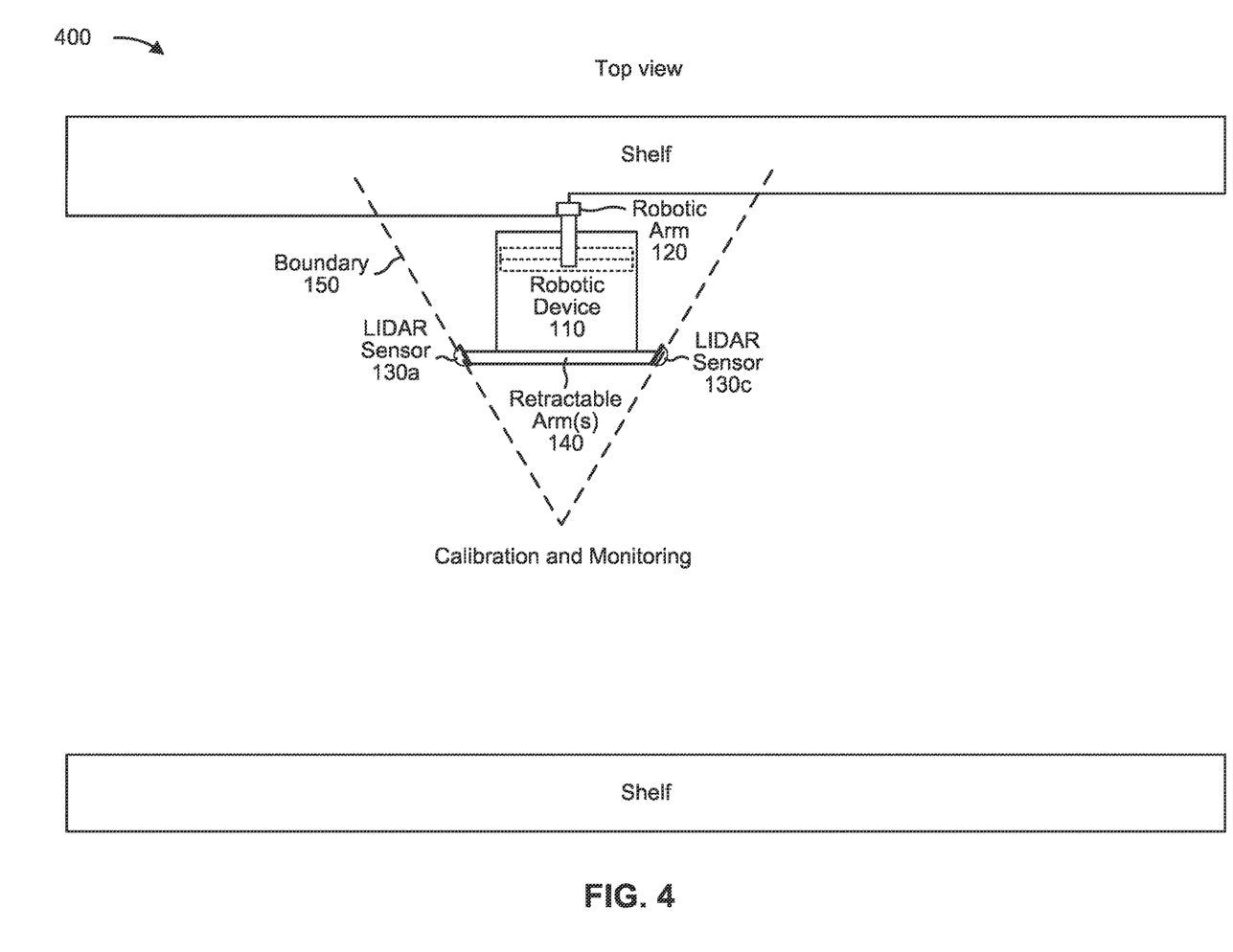
FIG. 4 is a diagram of a top-down view of an example implementation associated with a LIDAR arrangement, as described herein.

FIG. 4 is a diagram of a top-down view of an example implementation 400 associated with a LIDAR arrangement. As shown in FIG. 4, example implementation 400 includes a robotic device 110. The robotic device 110 is described in more detail herein.

As shown by example implementation 400, the LIDAR arrangement includes two 2D LIDAR sensors 130*a* and 130*c*, which are attached to retractable arms 140. The LIDAR sensors 130*a* and 130*c* are angled to provide a boundary 150 that encompasses an operational area of the robotic arm 120. In this way, the LIDAR arrangement may provide a boundary with only two 2D LIDAR sensors, which may further reduce the cost and complexity associated with LIDAR arrangements for controlling the use of the robotic arm 120.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. For example, example, the robotic device 110 may include multiple robotic arms, different moveable parts, more or fewer LIDAR sensors, a different combination of sensors (e.g., different types of LIDAR sensors, camera devices as sensors, and/or radar devices as sensors, among other examples), more or fewer retractable arms (e.g., some sensors may be fixed on the robotic device while others may be attached to a retractable arm), a different position or positions of the retractable arms, retractable arms with different positioning capabilities and different degrees of freedom to move in multiple dimensions, different degrees of freedom associated with the LIDAR sensors, different boundaries configured by the robotic device, and/or the like. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

As shown by the examples herein, a LIDAR arrangement may enable a robotic device to form a configurable boundary around a moveable part, and the moveable part may be enabled and/or disabled based on activity detected at the boundary. As a result, the robotic device is able to reconfigure and/or recalibrate the LIDAR sensor arrangement based on the physical environment of the robotic device and the moveable part(s) of the robotic devices. This may ensure that the robotic device is able to create a boundary, using the LIDAR sensor arrangement, that has a moveable field of view and is able to quickly detect and interpret sensor input from the LIDAR sensor arrangement in order to enable and/or disable the moveable parts. The ability to reposition the LIDAR sensors may lead to more precise boundaries and detection that is less likely to have blind spots in an operational region of the moveable parts (e.g., relative to fixed position sensors), and the sensor arrangement may also be capable of quickly detecting activity within the boundary to more quickly enable and/or disable the moveable parts (e.g., relative to slower and/or more complex sensor arrangements). In addition, the ability to reconfigure and/or recalibrate the LIDAR sensor arrangement may enable the robotic device to dynamically adjust a boundary based on the physical environment, which may change as the robotic device moves and/or the physical environment otherwise changes. In this way, the safety of people and objects that share a physical environment with the robotic device may be improved, and the cost and complexity associated with the use of more numerous and/or complex sensors may be reduced.

Figure 5:
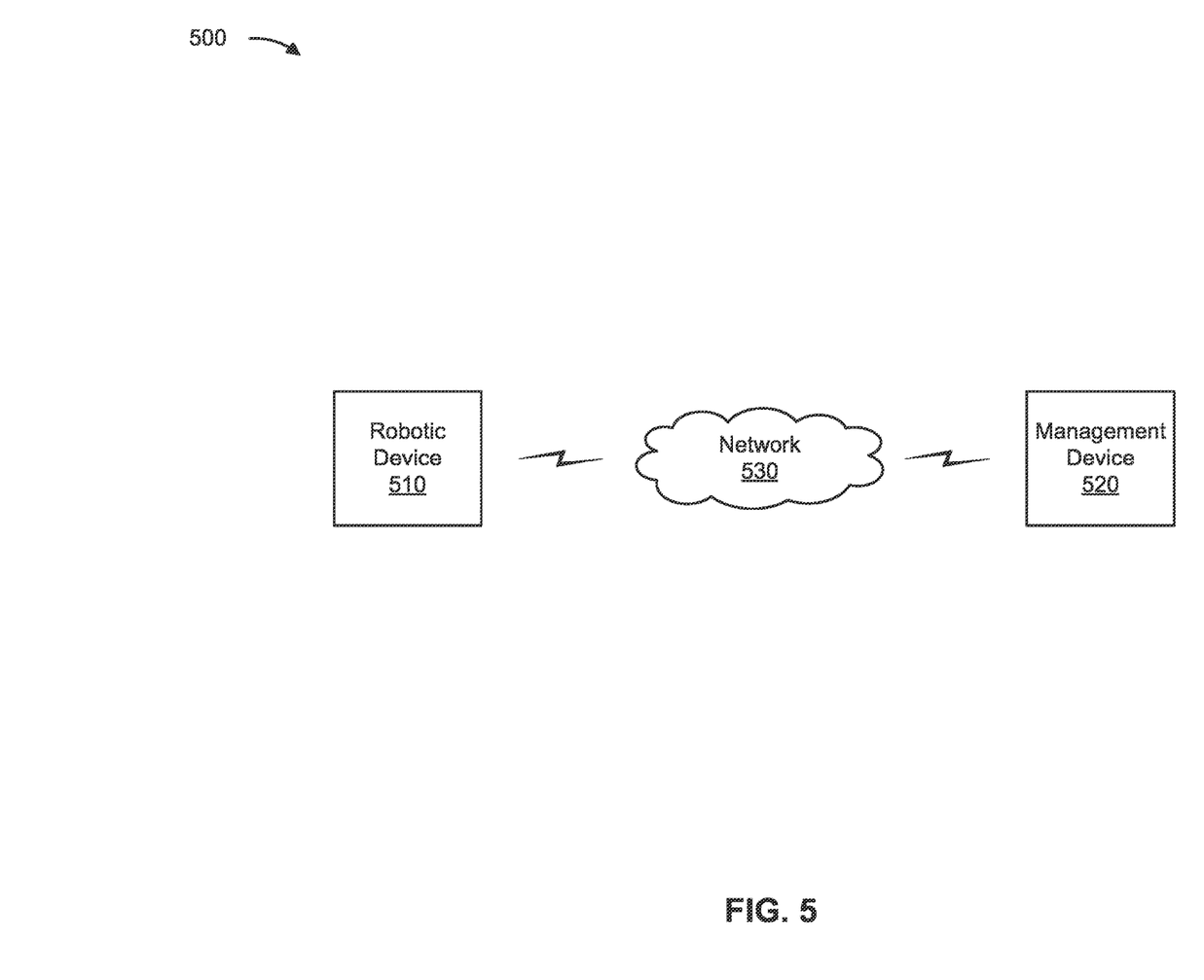
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a robotic device 510, a management device 520, and a network 530. Devices of environment 500 may interconnect via wired connections, wireless connections, or a combination of wired and wireless connections.

The robotic device 510 includes one or more devices capable of movement within a physical area, using one or more moveable parts, and supporting a LIDAR sensor arrangement, to perform operations within the physical environment while using the LIDAR sensor arrangement to control the use of a robotic arm. In addition, the robotic device 510 may be capable of receiving, generating, storing, processing, and/or providing information associated with calibrating and configuring boundaries associated with the robotic device and corresponding moveable parts, as described elsewhere herein. The robotic device 510 may include, or be included in, a moveable un-manned device, such as an automated cart, unmanned aerial vehicle, or similar type of device. The robotic device 510 may include a communication device and/or a computing device. For example, the robotic device 510 may include a wireless communication device, a mobile phone, a user equipment, a laptop computer, a tablet computer, a desktop computer, or a similar type of device capable of communicating with management device 520 and controlling the components of the robotic device 510, as described elsewhere herein.

The management device 520 includes one or more devices capable of receiving, generating, storing, processing, providing, and/or routing information associated with calibrating and configuring boundaries associated with robotic devices, as described elsewhere herein. The management device 520 may include a communication device and/or a computing device. For example, the management device 520 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), handheld scanning device, or a similar type of device; a server, such as an application server, a client server, a web server, a database server, a host server, a proxy server, a virtual server (e.g., executing on computing hardware), or a server in a cloud computing system. In some implementations, the management device 520 includes computing hardware used in a cloud computing environment.

The network 530 includes one or more wired and/or wireless networks. For example, the network 530 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 530 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
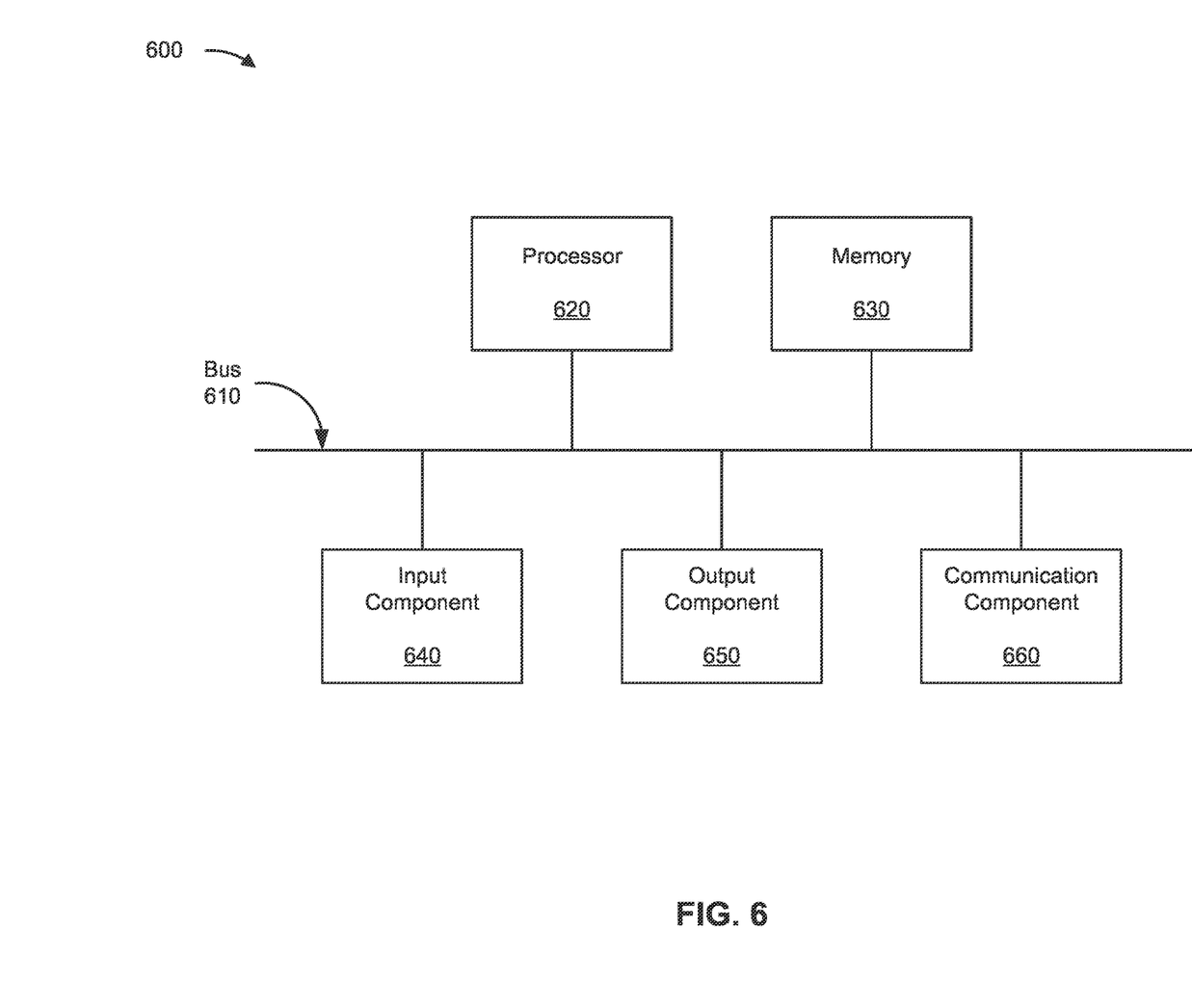
FIG. 6 is a diagram of example components of one or more devices of FIG. 5.

FIG. 6 is a diagram of example components of a device 600, which may correspond to robotic device 510, and/or management device 520. In some implementations, robotic device 510, and/or management device 520 include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry is used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
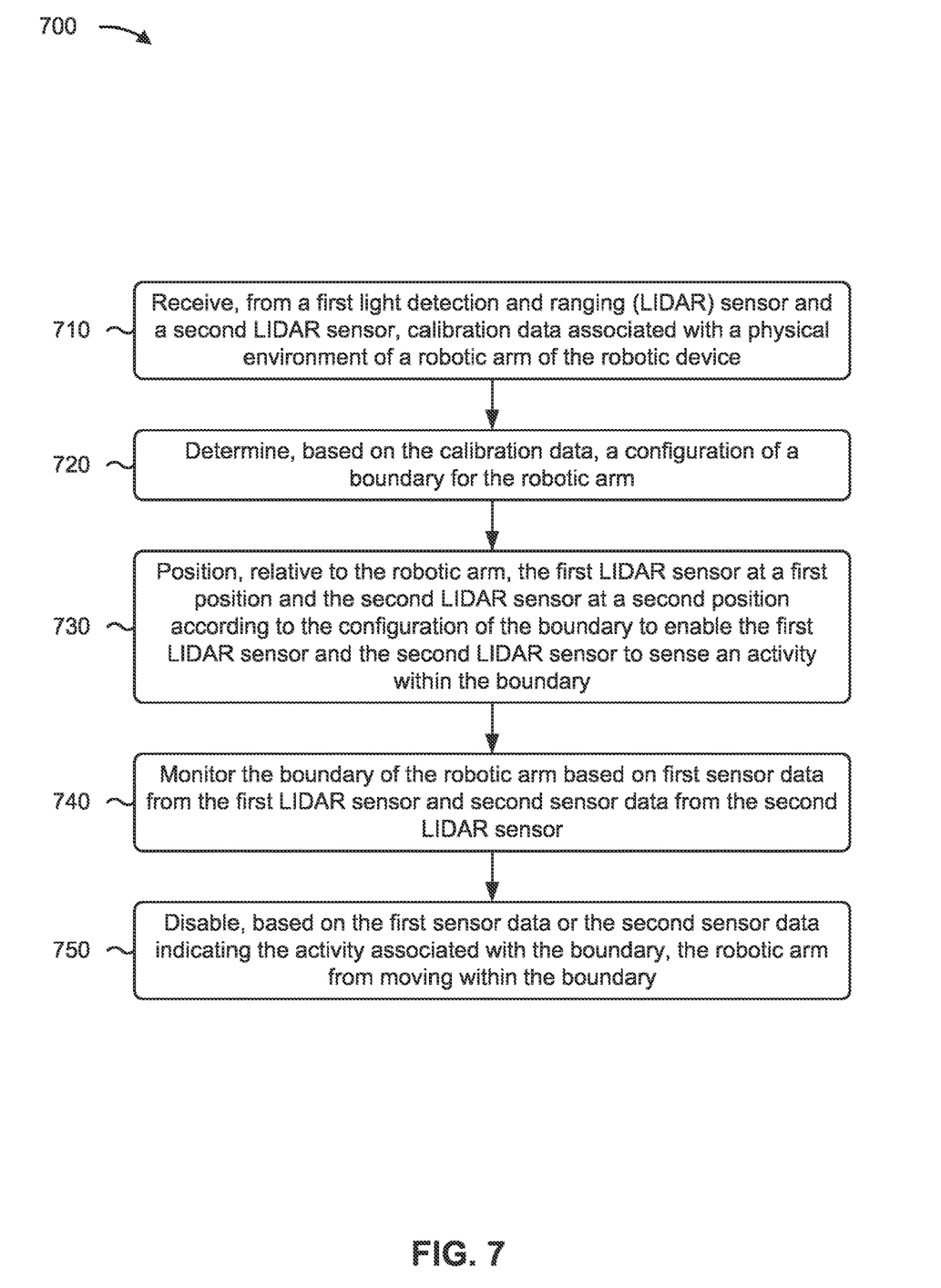
FIG. 7 is a flowchart of an example process relating to enabling or disabling use of a robotic arm.

FIG. 7 is a flowchart of an example process 700 associated with a LIDAR sensor system for enabling or disabling use of a robotic arm. In some implementations, one or more process blocks of FIG. 7 may be performed by a robotic device (e.g., robotic device 510). In some implementations, one or more process blocks of FIG. 7 may be performed by another device or a group of devices separate from or including the robotic device, such as a management device (e.g., management device 520). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving, from a first LIDAR sensor and a second LIDAR sensor, calibration data associated with a physical environment of a robotic arm of the robotic device (block 710). For example, the robotic device may receive, from a first LIDAR sensor and a second LIDAR sensor, calibration data associated with a physical environment of a robotic arm of the robotic device, as described above.

As further shown in FIG. 7, process 700 may include determining, based on the calibration data, a configuration of a boundary for the robotic arm (block 720). For example, the robotic device may determine, based on the calibration data, a configuration of a boundary for the robotic arm, as described above. In some implementations, process 700 includes configuring a first sensing range of the first LIDAR sensor according to the first position and a second sensing range of the second LIDAR sensor according to the second position.

In some implementations, process 700 includes receiving, from a management device, configuration data associated with an operational region of the robotic arm and configuring the boundary of the operational region based on the configuration data.

As further shown in FIG. 7, process 700 may include positioning, relative to the robotic arm, the first LIDAR sensor at a first position and the second LIDAR sensor at a second position according to the configuration of the boundary to enable the first LIDAR sensor and the second LIDAR sensor to sense an activity within the boundary (block 730). For example, the robotic device may position, relative to the robotic arm, the first LIDAR sensor at a first position and the second LIDAR sensor at a second position according to the configuration of the boundary to enable the first LIDAR sensor and the second LIDAR sensor to sense an activity within the boundary, as described above. The first and second LIDAR sensors may be direction sensors with a preconfigured sensing range.

In some implementations, the first and second LIDAR sensors are attached to a moveable support structure. For example, the first LIDAR sensor may be positioned via a first retractable arm of the robotic device and the second LIDAR sensor may be positioned via a second retractable arm of the robotic device. Process 700 may also include positioning at least one LIDAR sensor to match a vertical position of an end of the robotic arm. The first LIDAR sensor may be positioned to sense the activity in association with a first planar portion of the boundary, and the second LIDAR sensor may be positioned to sense the activity in association with a second planar portion of the boundary.

As further shown in FIG. 7, process 700 may include monitoring the boundary of the robotic arm based on first sensor data from the first LIDAR sensor and second sensor data from the second LIDAR sensor (block 740). For example, the robotic device may monitor the boundary of the robotic arm based on first sensor data from the first LIDAR sensor and second sensor data from the second LIDAR sensor, as described above. In some implementations, the process 700 may include monitoring the sensor data, to sense the activity, during a time in which the robotic arm is active within an operational region of the robotic arm.

As further shown in FIG. 7, process 700 may include disabling, based on the first sensor data or the second sensor data indicating the activity associated with the boundary, the robotic arm from moving within the boundary (block 750). For example, the robotic device may disable, based on the first sensor data or the second sensor data indicating the activity associated with the boundary, the robotic arm from moving within the boundary, as described above.

In some implementations, process 700 includes monitoring the first sensor data and the second sensor data to identify a period of inactivity within the boundary, and enabling, based on identifying the period of inactivity in a zone that is within the boundary for a threshold length of time, the robotic arm to move within the boundary. The period of inactivity within the boundary may be detected based on the first sensor data indicating inactivity within a first sensing plane of the first LIDAR sensor and the second sensor data indicating inactivity within a second sensing plane of the second LIDAR sensor. In some implementations, a duration of the period of inactivity is based on the configuration of the boundary. The physical environment may be a first physical environment, and the boundary and operational region associated with the robotic arm may be different from another boundary and another operational region associated with a second physical environment that is different from the first physical environment.

In some implementations, the process 700 may include determining a new configuration of a new boundary for the robotic arm based on an occurrence of a triggering condition. The triggering condition may include detecting passage of a period of time, detecting that the robotic device has moved, detecting that the robotic arm has moved, detecting that an object within the boundary has moved, detecting the activity associated with the boundary, and/or receiving instructions to recalibrate and/or reconfigure the boundary. Based on the new configuration, at least one LIDAR sensor may be repositioned.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for controlling a robotic device, comprising:
   receiving, from a first light detection and ranging (LIDAR) sensor and a second LIDAR sensor, calibration data associated with a physical environment of a robotic arm of the robotic device;
   determining, based on the calibration data, a configuration of a boundary for the robotic arm;
   positioning, relative to the robotic arm, the first LIDAR sensor at a first position and the second LIDAR sensor at a second position according to the configuration of the boundary to enable the first LIDAR sensor and the second LIDAR sensor to sense an activity within the boundary;
   monitoring the boundary of the robotic arm based on first sensor data from the first LIDAR sensor and second sensor data from the second LIDAR sensor; and
   disabling, based on the first sensor data or the second sensor data indicating the activity associated with the boundary, the robotic arm from moving within the boundary.

2. The method of claim 1, further comprising:
   configuring a first sensing range of the first LIDAR sensor according to the first position and a second sensing range of the second LIDAR sensor according to the second position.

3. The method of claim 1, further comprising:
   monitoring the first sensor data and the second sensor data to identify a period of inactivity within the boundary; and
   enabling, based on identifying the period of inactivity in a zone that is within the boundary for a threshold length of time, the robotic arm to move within the boundary.

4. The method of claim 3, wherein the period of inactivity within the boundary is detected based on the first sensor data indicating inactivity within a first sensing plane of the first LIDAR sensor and the second sensor data indicating inactivity within a second sensing plane of the second LIDAR sensor.

5. The method of claim 3, wherein a duration of the period of inactivity is based on the configuration of the boundary.

6. The method of claim 1, wherein the first LIDAR sensor is positioned via a first retractable arm of the robotic device and the second LIDAR sensor is positioned via a second retractable arm of the robotic device.

7. The method of claim 1, wherein the first LIDAR sensor and the second LIDAR sensor are direction sensors with a preconfigured sensing range.

8. The method of claim 1, further comprising:
   determining a new configuration of a new boundary for the robotic arm based on an occurrence of a triggering condition,
      wherein the triggering condition comprises one or more of:
         detecting passage of a period of time,
         detecting that the robotic device has moved,
         detecting that the robotic arm has moved,
         detecting that an object within the boundary has moved,
         detecting the activity associated with the boundary,
         receiving instructions to recalibrate and/or reconfigure the boundary; and
   repositioning at least one of the first LIDAR sensor or the second LIDAR sensor based on the new configuration.

9. A robotic device comprising:
a light detection and ranging (LIDAR) sensor arrangement;
a robotic arm; and
a controller configured to:
receive, from one or more LIDAR sensors of the LIDAR sensor arrangement, calibration data associated with a physical environment of the robotic device;
determine, based on the calibration data, an operational region of movement of the robotic arm;
position, based on a boundary of the operational region, the one or more LIDAR sensors into corresponding locations to sense an activity within the boundary; and
disable, based on sensor data from the one or more LIDAR sensors indicating the activity, the robotic arm to prevent the robotic arm from moving within the boundary.

10. The robotic device of claim 9, wherein the controller is further configured to:
receive, from a management device, configuration data associated with the operational region; and
determine the boundary of the operational region based on the configuration data.

11. The robotic device of claim 9, further comprising:
a moveable support structure,
wherein at least one LIDAR sensor, of the one or more LIDAR sensors, is attached to the moveable support structure; and
wherein the controller, when positioning the one or more LIDAR sensors, is further configured to:
position the at least one LIDAR sensor using the moveable support structure.

12. The robotic device of claim 9, wherein the controller, when positioning the one or more LIDAR sensors, is further configured to:
position at least one LIDAR sensor, of the one or more LIDAR sensors, to match a vertical position of an end of the robotic arm.

13. The robotic device of claim 9, wherein:
a first LIDAR sensor, of the one or more LIDAR sensors, is positioned to sense the activity in association with a first planar portion of the boundary, and
a second LIDAR sensor, of the one or more LIDAR sensors, is positioned to sense the activity in association with a second planar portion of the boundary.

14. The robotic device of claim 9, wherein the physical environment is a first physical environment; and
wherein the boundary and the operational region are different from another boundary and another operational region associated with a second physical environment that is different from the first physical environment.

15. The robotic device of claim 9, wherein the controller is further configured to:
monitor the sensor data, to sense the activity, during a time in which the robotic arm is active within the operational region.

16. A tangible machine-readable medium storing a set of instructions, the set of instructions comprising:
one or more instructions that, when executed by one or more processors of a controller of a robotic device, cause the controller to:
receive, from a first light detection and ranging (LIDAR) sensor and a second LIDAR sensor, calibration data associated with a physical environment of a robotic arm of the robotic device;
determine, based on the calibration data, a configuration of a boundary for the robotic arm;
position, relative to the robotic arm, the first LIDAR sensor at a first position and the second LIDAR sensor at a second position according to the configuration of the boundary to enable the first LIDAR sensor and the second LIDAR sensor to sense an activity within the boundary;
monitor the boundary of the robotic arm based on first sensor data from the first LIDAR sensor and second sensor data from the second LIDAR sensor; and
disable, based on the first sensor data or the second sensor data indicating the activity associated with the boundary, the robotic arm from moving within the boundary.

17. The tangible machine-readable medium of claim 16, wherein the one or more instructions further cause the controller to:
configure a first sensing range of the first LIDAR sensor according to the first position and a second sensing range of the second LIDAR sensor according to the second position.

18. The tangible machine-readable medium of claim 16, wherein the one or more instructions further cause the controller to:
monitor the first sensor data and the second sensor data to identify a period of inactivity within the boundary; and
enable, based on identifying the period of inactivity in a zone that is within the boundary for a threshold length of time, the robotic arm to move within the boundary.

19. The tangible machine-readable medium of claim 18, wherein the period of inactivity within the boundary is detected based on the first sensor data indicating inactivity within a first sensing plane of the first LIDAR sensor and the second sensor data indicating inactivity within a second sensing plane of the second LIDAR sensor.

20. The tangible machine-readable medium of claim 16, wherein the first LIDAR sensor is positioned via a first retractable arm of the robotic device and the second LIDAR sensor is positioned via a second retractable arm of the robotic device.

* * * * *